United States Patent
Wang et al.

(10) Patent No.: US 7,617,374 B2
(45) Date of Patent: Nov. 10, 2009

(54) HARD DISK TESTING METHOD UNDER EXTENSIBLE FIRMWARE INTERFACE

(75) Inventors: Zhi Wang, Tianjin (CN); Tom Chen, Taipei (TW); Win-Harn Liu, Taipei (TW)

(73) Assignee: Inventec Corporation, Taipei (TW)

( * ) Notice: Subject to any disclaimer, the term of this patent is extended or adjusted under 35 U.S.C. 154(b) by 506 days.

(21) Appl. No.: 11/710,530

(22) Filed: Feb. 26, 2007

(65) Prior Publication Data

US 2008/0209100 A1 Aug. 28, 2008

(51) Int. Cl.
*G06F 12/00* (2006.01)
*G06F 11/00* (2006.01)

(52) U.S. Cl. .................... 711/170; 711/162; 714/42; 713/2

(58) Field of Classification Search ............... None
See application file for complete search history.

(56) References Cited

U.S. PATENT DOCUMENTS

| | | | |
|---|---|---|---|
| 6,308,288 B1* | 10/2001 | Chang et al. | 714/38 |
| 6,418,541 B1* | 7/2002 | Jeon | 714/36 |
| 6,938,243 B1* | 8/2005 | Zeevi et al. | 717/124 |
| 2003/0097581 A1* | 5/2003 | Zimmer | 713/200 |
| 2005/0015215 A1* | 1/2005 | Zhang | 702/119 |
| 2005/0015652 A1* | 1/2005 | Han et al. | 714/6 |
| 2005/0193261 A1* | 9/2005 | Carr | 714/36 |
| 2006/0026339 A1* | 2/2006 | Rostampour | 711/103 |
| 2006/0047941 A1* | 3/2006 | Lai | 713/2 |
| 2007/0214390 A1* | 9/2007 | Liu et al. | 714/33 |
| 2008/0074107 A1* | 3/2008 | Fan et al. | 324/212 |
| 2008/0077973 A1* | 3/2008 | Zimmer et al. | 726/2 |

* cited by examiner

*Primary Examiner*—Matt Kim
*Assistant Examiner*—Kaushikkumar Patel
(74) *Attorney, Agent, or Firm*—Muncy, Geissler, Olds & Lowe, PLLC

(57) ABSTRACT

A hard disk testing method under an extensible firmware interface (EFI) is provided, which includes the following steps. A system file is backed up from the EFI of the hard disk into a storage area of a memory. The backup area of the system file is mapped as a real hard disk. A non-system file storage area is established in the memory, so as to store the non-system files of a hard disk test. Information of the system and non-system files of the hard disk test is acquired, so as to generate a system and a non-system file link table. When performing the test, the non-system files are backed up into the non-system file storage area. The system file link table and/or the non-system file link table is accessed, so as to load the system file and/or the non-system files directly from the storage area of the memory.

6 Claims, 4 Drawing Sheets

HARD DISK TESTING METHOD UNDER EXTENSIBLE FIRMWARE INTERFACE

BACKGROUND OF THE INVENTION

1. Field of Invention

The present invention relates to a hard disk testing method. More particularly, the present invention relates to a hard disk testing method under an operating environment of an extensible firmware interface (EFI) system.

2. Related Art

The hard disk device is a main component of a computer and is the most important device in the storage system of the computer, which not only has the function of recording data information, but the property thereof also has a direct influence on the property of the whole computer system. As a storage device, whether or not the hard disk has damaged areas is an important index of its property. Therefore, whether or not the storage space of the whole disk can be fully tested is a problem to be solved of the current technology.

Under the test environment of EFI shell, during the reading and writing for storage areas of the hard disk, when some sectors occupied by the EFI system are read, if reading and writing are performed directly with a processing method of installing an ordinary file, the lack of EFI's protection to the system files results in a system crash. Therefore, the system file areas need to be protected, and the related system files need to be stored in the hard disk due to the system itself. The storage of the system files occupies some hard disk space, so when testing the storage space occupied by the system files or other files, it is very difficult to realize an overall test for the storage space.

SUMMARY OF THE INVENTION

In order to solve the problems and defects in the above conventional art, the present invention is directed to provide a hard disk testing method under an EFI, which is capable of protecting the security of the computer system as well as realizing the overall test of the whole hard disk.

Accordingly, the hard disk testing method under an EFI provided in the present invention includes the following steps. A system file of the EFI of a hard disk is backed up into a storage area of a memory. The backup area of the system file is mapped as a real hard disk. A non-system file storage area is established in the memory, so as to store the non-system file in a file area of the hard disk test. Information of the system file and the non-system file of the hard disk test is acquired, so as to generate a system file link table and a non-system file link table respectively. When performing the hard disk test, the non-system file of the hard disk test is backed up into the non-system file storage area. Finally, the system file link table and/or the non-system file link table is accessed, so as to load the system file and/or the non-system file of the hard disk test directly from the storage area of the memory.

In the present invention, the system configuration files required when operating the EFI system and the non-system files corresponding to tested hard disk blocks are backed up into the memory areas, and link tables of the system files and the non-system files are established, and thus when testing, the corresponding test files can be loaded directly from the memory, thus avoiding the reading and writing operation to the hard disk. Therefore, the present invention can not only accelerate the speed of the test and prevent the system from being damaged, but also can realize the overall test of the hard disk.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

The features and practice of the preferred embodiments of the present invention will be illustrated in detail below with the accompanying drawings.

Figure 1:
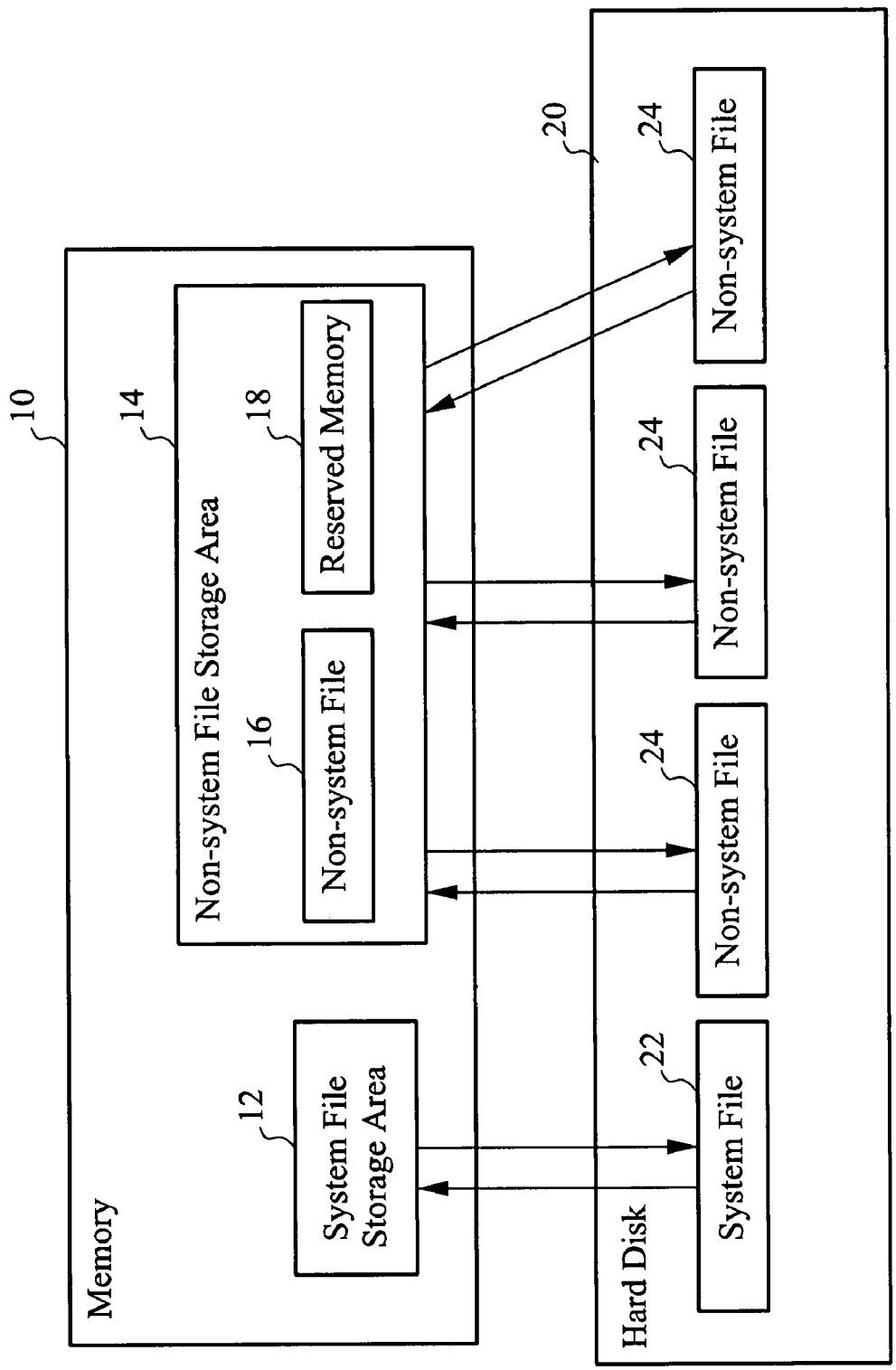
FIG. 1 is a schematic view of the hard disk storage in the hard disk testing method under the EFI according to the present invention.
Figure 2:
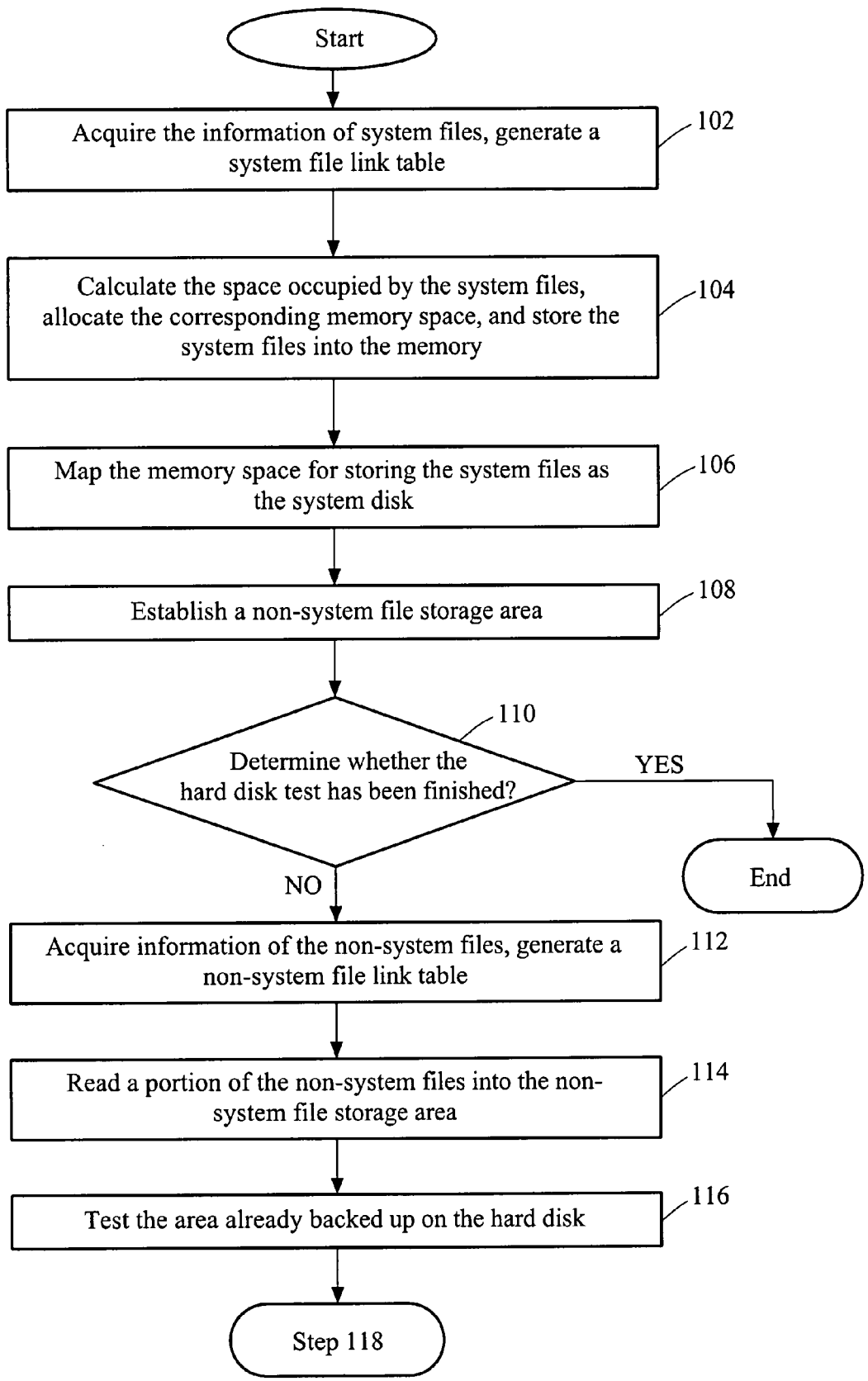
FIGS. 2, 3 and 4 are flow charts of the hard disk testing method under the EFI according to the present invention.
Figure 3:
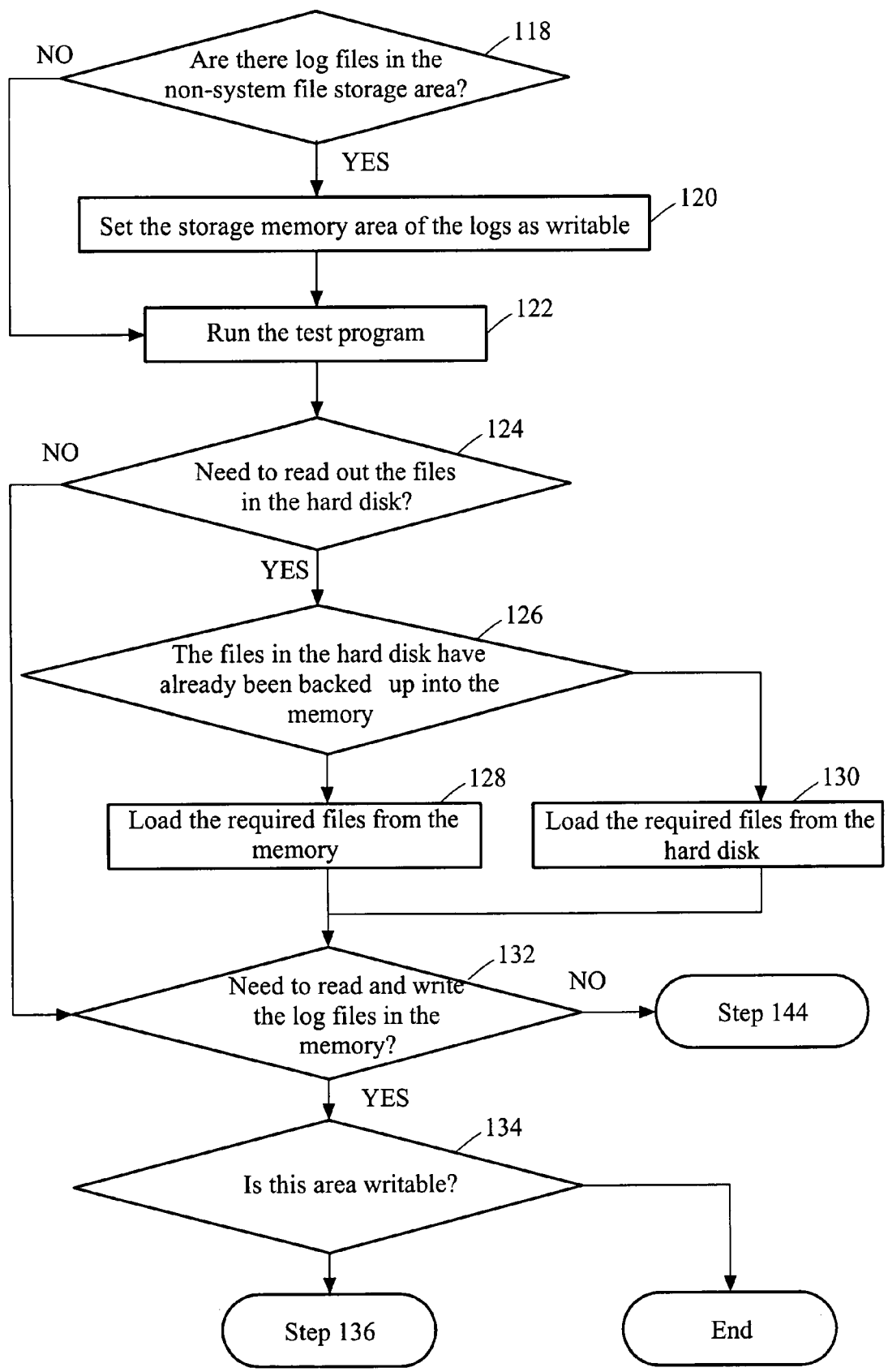
Figure 4:
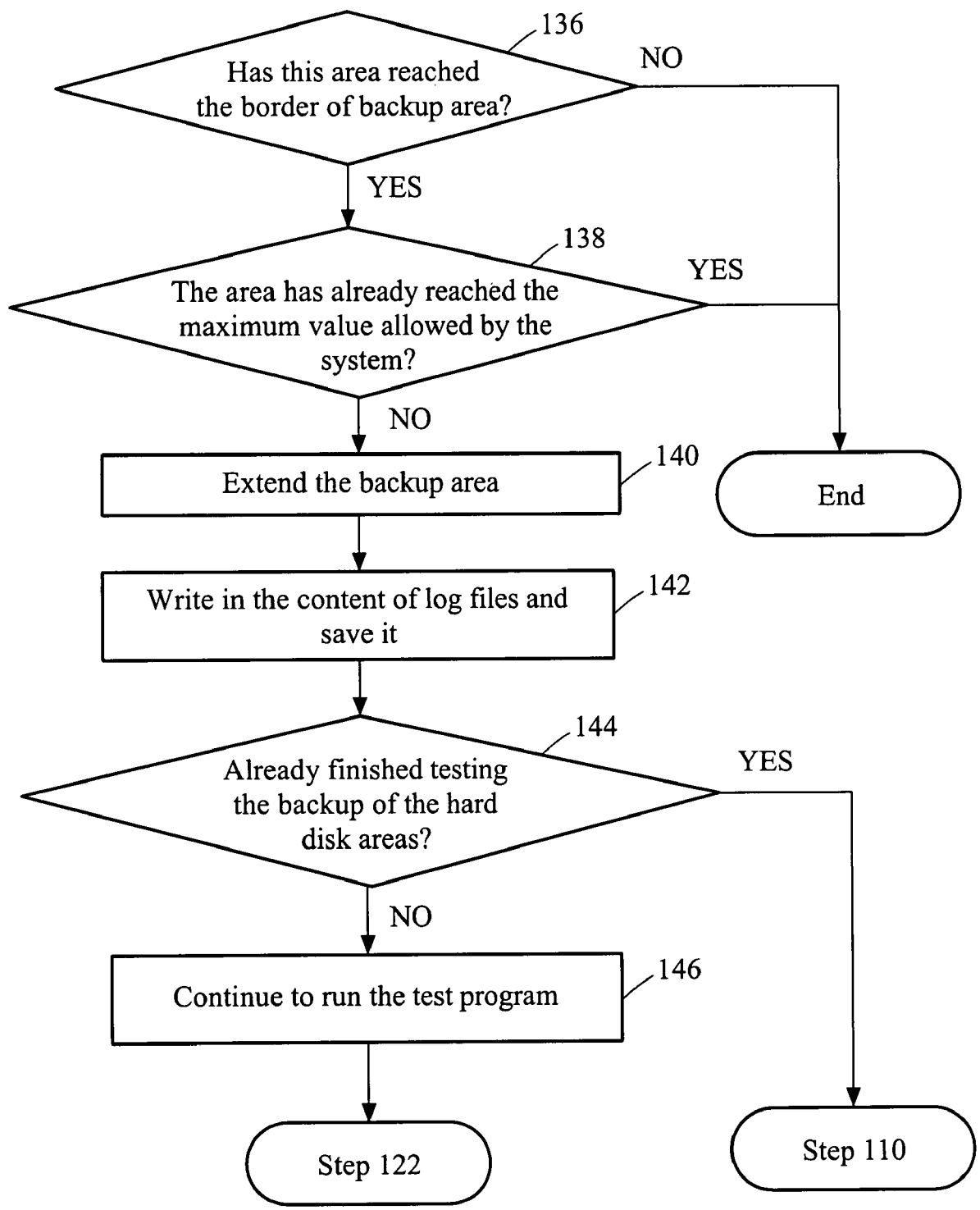

Referring to FIG. 1 and FIG. 2 to FIG. 4, FIG. 1 is a schematic view of hard disk storage in a hard disk testing method under an EFI according to the present invention, and FIG. 2 to FIG. 4 are flow charts of the hard disk testing method under the EFI according to the present invention.

Referring to FIG. 2, first, a system file of an EFI system is acquired to generate a system file link table (Step 102). The system file is defined as the following: during the operation of the EFI system, an environment in which EFI programs can operate needs to be established, and which includes the driving programs for accessing various apparatuses, and the configuration files in the operation of the system, the files are necessary when operating the system, and cannot be damaged, otherwise, the whole system will be crashed. As is mentioned in the prior art, in the test environment of the EFI, due to the lack of the protection of the system files, the direct reading or writing for the system files in the hard disk will cause the system crash. Therefore, here in the present invention, the system files are protected and backed up into a memory. When backing up the system files, the file backup is adapted instead of the partition backup to decrease the waste of the backup space and to decrease difficulty in file restoration.

The related information of the hard disk is acquired through scanning the hard disk, thereby acquiring the types of the system files on the hard disk and the occupied areas. The size of the files and storage paths are acquired according to the data, so as to create a file link table to store the respective information, and calculate the memory space needed for storing the files. Then, the corresponding memory space is allocated, so as to store the system files (Step 104). Referring to the embodiment in FIG. 1, the memory 10 has a system file storage area 12, and after the content of a system file 22 in the hard disk 20 is all backed up therein, the system file storage area 12 is mapped as a real hard disk (Step 106). After finishing the system test, this part of content can be restored into the hard disk.

As for non-system files of the hard disk test, a non-system file storage area 14 is established in the memory (Step 108), so as to store a tested non-system file 16 backed up to the memory. Non-system files 24 are other files except for the system file when the EFI system is operating, which protect some system logs, auxiliary tools and diagnostic programs and so on. The non-system files are stored dispersedly in other partitions of the hard disk and occupy considerable space, so it is very difficult to store the system file 22 and the non-system files 24 simultaneously into the memory 10. Therefore, a portion of the memory space is partitioned, i.e., the non-system file storage area 14, to function as the store space for the non-system files 24, and only when the files need to be tested, are the files backed up into it. Besides, to guarantee the storage of the subsequent information, a part of the memory 18 can be reserved in the non-system files storage area 14 to prevent the problem of lack of space in the subsequent access.

After finishing the above steps of backing up the system file and the non-system files, the hard disk test can be performed. When testing, it is determined whether the hard disk test has already been finished (Step 110), if yes, the test is ended; if no, the information of the non-system files in the hard disk test block is acquired to generate a non-system file link table (Step 112). This part of non-system file is read to the non-system file storage area (Step 114), and test the areas of the hard disk already backed up to the memory (Step 116). When testing, it is further determined whether there are log files in the non-system file storage area (Step 118). If yes, the memory area for storing the part of logs is set as writable (Step 120); if no, the test program is run directly (Step 122).

Then, it is determined whether it is required to read the files in the hard disk (Step 124). If yes, it is further determined whether the files to be tested in the hard disk have already been backed up into the memory (Step 126); if no, the process proceeds to Step 132. If the files have already been backed up into the memory, the required files are loaded from the memory (Step 128); otherwise, the required files are loaded from the hard disk (Step 130). When loading the files of the memory, through the dynamic link tables formed when accessing the system files and the non-system files stored in the memory, the current storage condition can be recorded. When accessing a certain file, the system file link table or the non-system file link table is accessed first. If the file is recorded in the above link tables, it indicates that this file is stored in the memory. Therefore, it is not required to read from the hard disk when accessing, instead, this file is loaded directly from the memory, and thereby accelerating the speed of the test.

In addition, some important files need to be protected to prevent the misoperations, and then the attribute of the backup areas of the files is set as read-only. When performing the operation of backing up the content to the memory, in order to protect the test content, it is determined whether the set attribute is read-only first. Write operation can be performed to this area only when no corresponding restrictions exist. At the same time, to prevent the operation areas from crossing the border and causing the incomplete restoration of the hard disk after finishing the test, it is required to determine whether or not the operation areas cross the border, and to extend the memory space that crosses the border. For example, when storing the log files, it is determined whether it is required to read or write the log files in the memory (Step 132), if not, the process proceeds to Step 144; if so, it is further determined whether the memory area for storing the log files is a writable area (Step 134). If it is not writable, the system reports the error and exits to end the process; if it is writable, the log files increase with the increase of the written content, so when the content increases, it is required to further determine whether or not the log storage area has already reached the border of the backup area (Step 136). If so, it is determined whether the backup area of the non-system files crosses the allowable maximum value of the system memory (Step 138); if not, the backup area of the non-system files is extended (Step 140). A progressive mode can be used to extend the memory. For example, in order not to waste the resource of the system memory but to extend the backup area preferably, the memory occupied by every extension can be set as 1 M bytes. In other words, under such a condition, after the capacity of the backup area of the non-system files increases by 1 M bytes, it is determined whether or not the backup area has already exceeded the maximum value of the system memory. If so, the errors are reported; if not, the backup area of the non-system files is extended by 1 M bytes.

After extending the backup area, the content of log files is written and saved (Step 142). In the process of testing, it is required to determine whether or not the test of the backup of the hard disk areas has already been finished (Step 144), if the hard disk test has already been finished, the method is ended. If the test has not been finished, the method continues to run the test program (Step 146), and repeats the Step 122 to Step 144. At the same time, after finishing the test of a certain block area of the hard disk, a new test file needs to be loaded onto the non-system file backup area of the memory, and the files backed up into the memory are restored into the hard disk. While loading the new file, the non-system file link table is updated according to the new file information, so as to record the file information. It should be noted that, in the above steps, the log files are only an embodiment of the non-system files, and the present invention is not limited to the above embodiment. Various types of non-system files containing the log files all perform the abovementioned corresponding steps, so as to protect the files and extend the memory.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hard disk testing method under an extensible firmware interface (EFI), applicable to an environment of EFI, comprising:

backing up a system file of the EFI of a hard disk test into a storage area of a memory;

mapping backup area of the system file as a real hard disk;

establishing a non-system file storage area in the memory, so as to store a non-system file from a file area of the hard disk test;

acquiring information of the system file and the non-system file of the hard disk test, so as to generate a system file link table and a non-system file link table respectively;

backing up the non-system file of the hard disk test into the non-system file storage area when performing the hard disk test; and accessing the system file link table and/or the non-system link table, so as to load the system file and/or the non-system file of the hard disk test directly from the storage area of the memory.

2. The hard disk testing method under an EFI as claimed in claim 1, wherein the step of backing up a system file of the EFI further comprises:

acquiring a size and a storage path of the system file;

calculating a space occupied by the system file, so as to allocate a corresponding storage area of the memory; and storing the system file to the corresponding storage area of the memory.

3. The hard disk testing method under an EFI as claimed in claim 1, wherein when reloading a new non-system file of the hard disk test to the non-system file storage area of the memory, the method comprises a step of updating the non-system file link table according to an information of the new non-system file.

4. The hard disk testing method under an EFI as claimed in claim 1, further comprising a step of extending the non-system file storage area according to a size of a file area of the hard disk test.

5. The hard disk testing method under an EFI as claimed in claim 1, further comprising a step of restoring the backup of the system file and/or the backup of the non-system file in the memory to the hard disk test after finishing the hard disk test.

6. The hard disk testing method under an EFI as claimed in claim 1, further comprising a step of presetting a reserved memory in the non-system file storage area.

\* \* \* \* \*